United States Patent
Wise et al.

[15] 3,701,240
[45] Oct. 31, 1972

[54] TOBACCO TOPPING APPARATUS

[72] Inventors: David F. Wise; R. B. Tyndall; Donald E. Jones, all of Clinton, N.C.

[73] Assignee: Vann Industries, Inc., Clinton, N.C.

[22] Filed: Jan. 12, 1970

[21] Appl. No.: 2,110

[52] U.S. Cl. .................................... 56/63, 56/14.3
[51] Int. Cl. ............................................. A01d 45/02
[58] Field of Search ............... 56/56–59, 63, 10.9, 56/13.6, 14.3, 235, 6

[56] References Cited

UNITED STATES PATENTS

| | | | |
|---|---|---|---|
| 3,482,379 | 12/1969 | Splinter et al. | 56/63 |
| 3,144,743 | 8/1964 | Gaunt et al. | 56/59 X |
| 2,720,740 | 10/1955 | Price | 56/13.6 |
| 2,842,926 | 7/1958 | Nelson | 56/10.9 |
| 2,977,741 | 4/1961 | Stroman | 56/13.6 |

*Primary Examiner*—Russell R. Kinsey
*Attorney*—David Rabin

[57] ABSTRACT

An attachment adapted to be mounted on a tractor or other mobile support for traversing rows of tobacco plants to remove the bloom or top portions from the stalks. A cutting and conveying unit generally aligned with a plant row utilizes guide arms for directing each stalk to a rotary saw for removing the top portion of each plant, and conveyors for gripping and positively displacing the cut top portions rearwardly and to one side of the plant row to insure that the tops do not fall into the plant row just topped.

7 Claims, 4 Drawing Figures

FIG. I

INVENTORS
DAVID F. WISE
R.B. TYNDALL
DONALD E. JONES

INVENTORS
DAVID F. WISE
R.B. TYNDALL
DONALD E. JONES

PATENTED OCT 31 1972 3,701,240

INVENTORS
DAVID F. WISE
R.B. TYNDALL
DONALD E. JONES

TOBACCO TOPPING APPARATUS

BRIEF SUMMARY AND OBJECTS OF THE INVENTION

This invention relates to a mechanism adapted to be mounted on a tractor or other mobile support for traversing rows of tobacco plants to remove the top portions therefrom.

After tobacco stalks have reached substantially their full height, it has been the usual practice to perform topping operations on the plants by removing the very top or bloom portions therefrom. This operation, which is usually accomplished by laborers produces a wider leaf spread thus contributing to a heavier plant and more pounds to the acre.

In a preferred embodiment of the present invention, a plurality of cutting and conveying units are adjustably positioned upon a frame above rows of plants for removing the tops therefrom by rotary saws and for gripping and conveying the severed top portions to one side of the rows topped. The severed tops are held between pairs of conveyor belts and constantly gripped and controlled as they are discharged to a discharge location intermediate plant rows. Guide arms cooperate with the conveyors to gather and direct the plant tops to the rotary saws while wiper or deflector blades depress the upper leaves below the saw blades to prevent damage to the upper leaves. The frame is adapted to be adjustably positioned above the ground upon a mobile support which also serves as a source of power for driving the conveyor belts and rotary saws. Alternatively power may be derived from a source located upon the frame.

One of the primary objects of the invention is a tobacco plant topping mechanism including novel means for severing the upper portions of the plant and for constantly gripping and conveying the severed portions in a relatively upright position to a discharge location intermediate adjacent rows of plants.

Another object of the invention is the provision of a rugged and reliable tobacco topping mechanism which is simple to use and maintain and which is economical to manufacture.

A further object of the invention is the provision of a tobacco topping mechanism which can be adjustably mounted, to the height of the plants, readily and conveniently on a conventional mobile support.

Still another object of the invention is the provision of a novel means for gathering and directing the plant stalks to a rotary cutter and for depressing the upper leaves of the plants below the cutter.

These and other objects of the invention will be readily apparent during the course of the following detailed description.

DETAILED DESCRIPTION OF THE INVENTION

Figure 1:
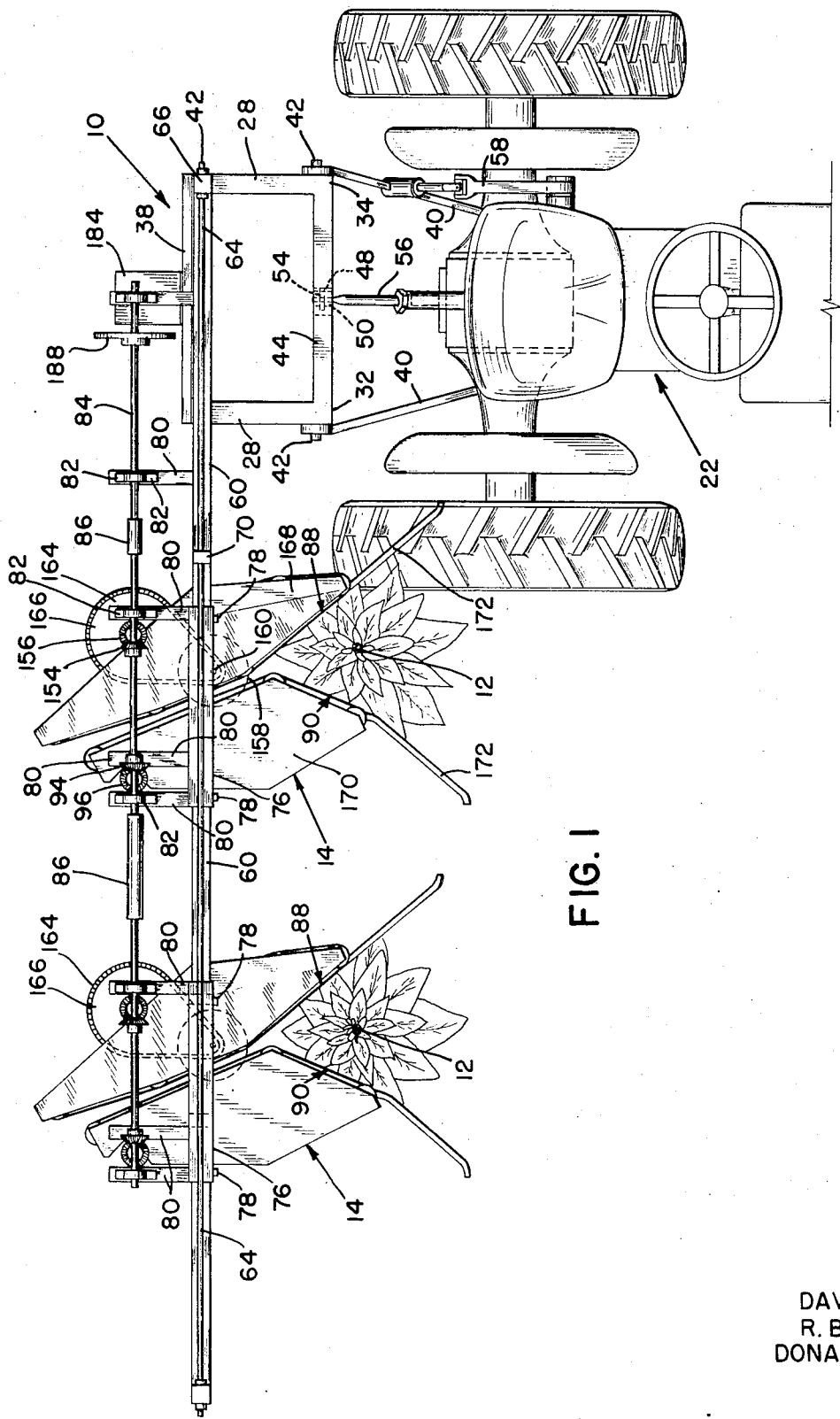
FIG. 1 is a top plan view of the topping apparatus of the present invention mounted on a conventional tractor.

This invention consists of an attachment 10, adapted to be mounted on a tractor or other suitable mobile support, for topping or removing the very top portion of tobacco stalks 12, the tractor or mobile support providing a source of power for driving the attachment as well as a support for traversing the rows of plants.

The attachment 10 consists of two laterally spaced cutting and conveying arrangements 14 mounted upon a frame 16 having a vertically disposed portion 18 secured to a tractor and a horizontally extending portion 20. The cutting and conveying arrangements 14 are adjustably supported on the horizontal frame portion 20 adjacent rows of the plants to be topped.

Figure 2:
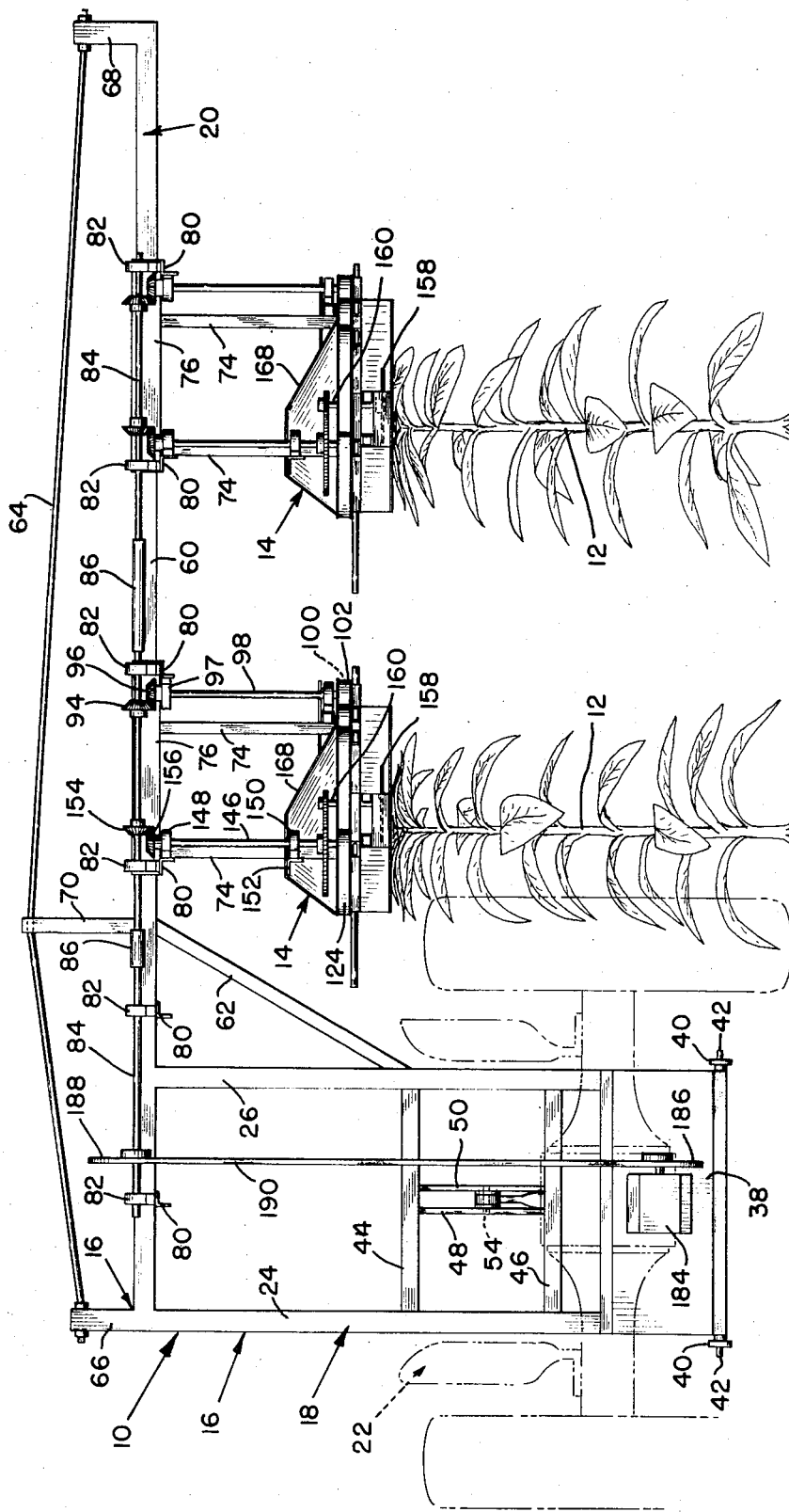
FIG. 2 is a rear elevational view of the topping apparatus of FIG. 1.

The frame 16 is preferably constructed as a rigid unit and removably secured to a conventional tractor 22 or other suitable vehicle. In the embodiment illustrated, the vertically extending posts 24, 26 are rigidly connected by cross beams 28, 30 to a pair of posts 32, 34 positioned in spaced parallel relation with posts 24, 26. Each of posts 32 and 34 is provided with a plurality of openings 36 adapted to have pins 42 releasably secured therein. Lifting arms 40 which are pivotably secured to the tractor 22 are adapted to be coupled to the pins 42, as shown by FIGS. 1 and 2, for supporting frame 16. Beams 44, 46 interconnecting the posts 32, 34 also serve as supports for spaced parallel plates 48, 50. The plates 48 and 50 are provided with a series of vertically spaced openings 52 aligned to receive a pin 54 therethrough. The pin 54 serves to adjustably connect an adjustable linkage 56, which is pivotably secured at one end to the tractor 22, to the frame 16 through plates 48 and 50. The entire frame 16 may be raised and lowered by a positively actuated linkage arrangement 58 attached to the tractor and connected to one or both of the lifting arms 40. The linkage arrangement 58 may be controlled in a conventional manner by the tractor operator.

The horizontally disposed portion of the frame 16 includes a beam 60 secured to the upper extremities of posts 24, 26. The beam is maintained in a substantially horizontal position by a brace 62 and a support rod 64. The rod 64 is secured by a suitable fastening means at one end to an extension 66 of post 24 and at the other end to a vertical post 68 supported upon the outermost end portion of beam 60. A post 70, located on the beam 60 above brace 62, supports the rod 64 intermediate the ends thereof.

The cutting and conveying arrangements 14 are suspended below the beam 60 by depending spaced, parallel tubular members 74. Each pair of tubular members 74 is secured to a sleeve-like member 76 which encompasses beam 60 and is adjustably slideably positioned thereon by fasteners 78. A plurality of angle members 80 extend horizontally normal to the beam 60, each plate having a bearing means 82 secured to the upper portions thereof for rotatably supporting a drive shaft 84. The shaft 84 preferably is formed of two or more sections adjustably secured together through sleeve-type collar means 86 to facilitate positioning of the cutting and conveying arrangements longitudinally of the beam 60.

Conveyor units 88, 90 are mounted in opposed relation upon members 74 for directing the top portions of plants to a rotary cutter or saw 158 and for gripping and displacing the cut plant portions laterally to a location intermediate two rows of plants.

Figure 4:
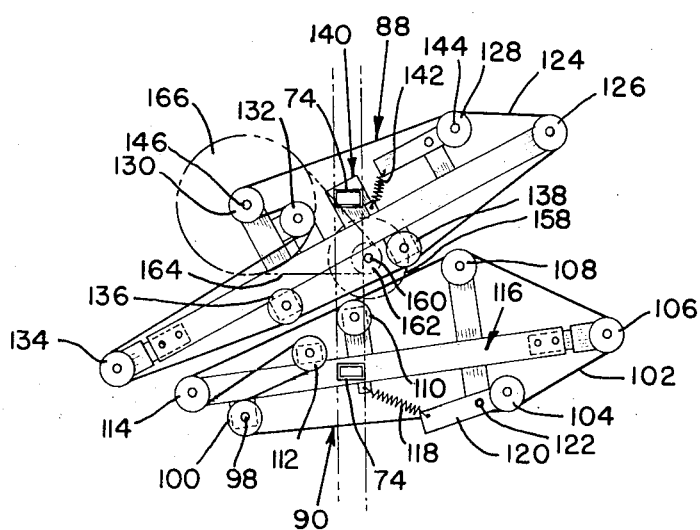
FIG. 4 is an enlarged top plan view of the cutting and conveying apparatus taken along line 4—4 of FIG. 3.

The unit 90 includes an endless belt 102 driven from shaft 84 through inter-engaging bevel gears 94, 96, shaft 98 and pulley 100. Shaft 98 is rotatably supported by bearings 97 mounted on an angle plate 80. The belt 102 passes around a series of pulleys 104, 106, 108, 110, 112 and 114, in addition to driven pulley 100, arranged as shown by FIG. 4. The pulleys are supported for rotation about vertical axes on a framework 116 secured to the lowermost end portion of one of the tubular members 74. Pulley 106 may be adjustably mounted on framework 116 for maintaining the belt 102 in a relatively taut condition. Pulley 104 is biased in a direction against the belt, as shown by FIG. 4, and serves as a shock absorber when unusually bulky plants or foreign objects tend to jam belts 102, 124 as they pass therebetween. The pulley 104 is mounted upon a lever 120 which is pivoted upon frame 116 at 122 and urged by spring 118, interconnected between the lever and frame, in a clockwise direction as shown by FIG. 4.

Unit 88 includes a belt 124 extending around a plurality of pulleys 126, 128, 130, 132, 134, 136 and 138, all pulleys being mounted upon frame 140 for rotation about vertical axes. Pulley 128 is biased by spring 142 about pivot 144, similarly to pulley 104 of unit 90, to serve as a shock absorber for belt 124 and pulley 134 may be adjustable on frame 140. The framework 140 is attached to the lower end of the tubular member 74 depending from beam 60. The belt 124 is driven from pulley 130 which is secured to shaft 146. Shaft 146, mounted in a bearing 148 supported by angle plate 80 and the bearing 150 supported upon angle plate 152, is driven through bevel gears 154, 156 and shaft 84.

Note that the forwardmost pulleys 106 and 126 of units 90 and 88, respectively, cooperate with pulleys 108, 138 to direct the belts 102, 124 such that the same converge, see FIG. 4, to direct the upper portions of the stalks in each row to a relatively vertical position before they are severed from the remainder of the plants. The run of belt 102 between pulleys 108 and 114, and the run of belt 124 between pulleys 138 and 134 are substantially parallel and spaced proximate to each other to grip and convey the plant top portions after they have been severed.

The stalk top portions are cut by a rotary saw blade 158 which is secured to a shaft 160 mounted upon framework 140. The upper end of shaft 160 has a sprocket 162 fixed thereon driven from chain 164 and sprocket 166. The sprocket 166 is mounted for rotation with shaft 146 of unit 88.

Each of the conveyor units 88 and 90 are provided with cover units 168, 170 to prevent plant leaves from getting entangled with the pulleys, chain and sprockets. The cover 168 is inclined toward parallel runs of belts 102, 124, as shown most clearly in FIGS. 2 and 3, to insure that the severed tops do not fall into the plant row just topped. Guide members 172, 172, one member being secured to the forward portion of each of units 88 and 90, are angularly positioned relative to each other as shown by FIG. 1 to gather leaning plants and direct them to the conveyors 102 and 124 and subsequently to saw 158.

Figure 3:
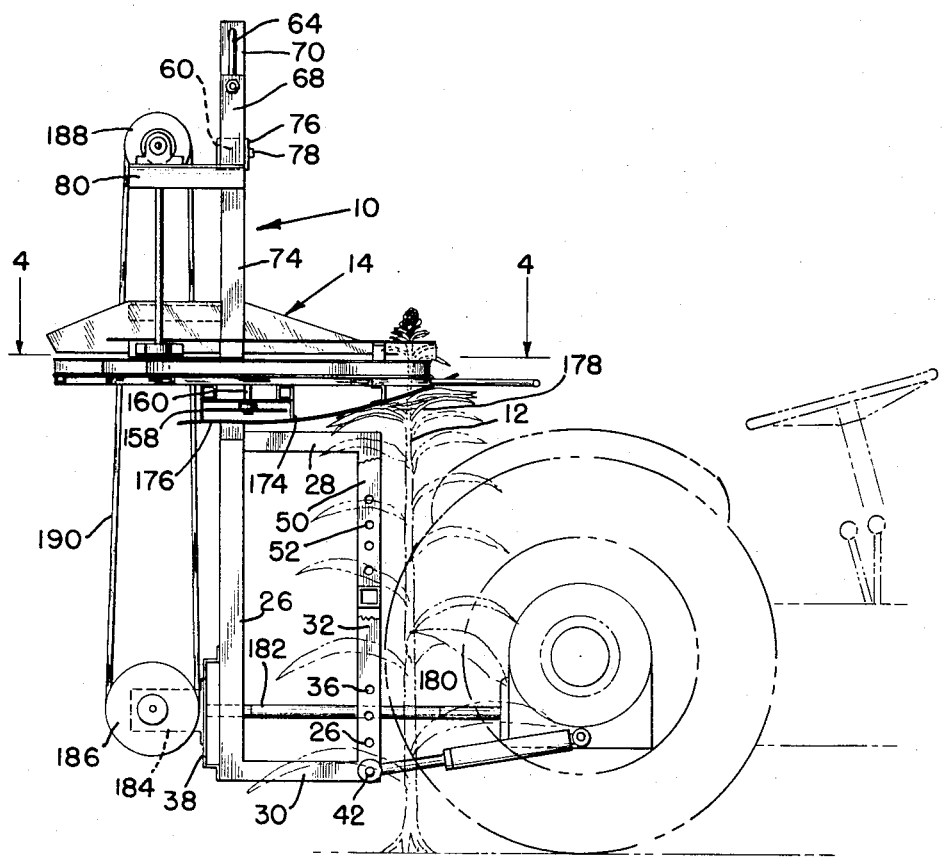
FIG. 3 is a side elevational view of the apparatus of FIG. 2.

Each of the cutting and conveying arrangements 14 is provided with a pair of wiper blades 174 for depressing the top or upper leaves below the saw blade 158 prior to topping of the plant to remove the bloom portion therefrom. The blades 174 are positioned in opposed relation, one blade being below each of units 88, 90, and inclined, as shown by FIG. 3, such that the rearward portion 176 is located below saw 158 and the forward portion 178 is turned upwardly and extends above the belts 102, 124.

The shaft 84 which extends parallel to the horizontal beam 60 to drive the cutting and conveying arrangements 14 receives its drive from the tractor power take-off which is connected through a flexible drive coupling to drive a gear box 184 which is mounted on plate 38. Pulleys 186 and 188, attached to gear box 184 and shaft 84, respectively, and a drive belt 190 completes the drive train from the power take-off to the saw blade 158 and belts 102, 124. Variations in the means for driving the saw blades and belts are contemplated within the scope of the invention.

As previously mentioned, each of the cutting and conveying arrangements 14 is adjustably positioned laterally of beam 60 so as to be generally located above a plant row, as shown by FIG. 1. Furthermore, while two units 14 have been disclosed as supported by the attachment 10, three or more units or only one unit could be utilized on beam 60 with equally satisfactory results. Since the plants to be topped may vary in height, even in the same field, the attachment 10 can be adjustably supported upon the tractor within the desired openings 36 and 52 in the frame. Also, the height of attachment 10 above ground level may be varied by raising or lowering arms 40 through linkage arrangement 58. The attachment 10 is adapted for harvesting or topping crops other than tobacco where it is desirable to remove the tops or heads from the plants.

As the attachment 10 is moved through a field of tobacco by a tractor or the like, the cutting and conveying units 14 are driven at suitable speeds from the tractor power take-off or other drive means. As the attachment traverses one or more rows of plants, the blades 158 are driven at a speed sufficient to sever the top portions of the plants. At the same time the guide members 172 and forward portions of conveyor belts 102, 124 direct the plant stalks into the path of the saw blades. The inner runs of belts 102, 124 positioned in closely spaced relation to each other travel in the same direction and at the same speed to grip the upper portion of the plants just prior to the time they are to be severed from the plant stalks. The belts positively feed the severed plant top portions rearwardly and to one side of the plant row to prevent the tops from falling onto the rows just topped.

While the attachment 10 has been illustrated as mounted on a conventional tractor for convenience, it is to be understood that the attachment may be mounted on a machine having an overall width such that it can pass between alternate rows of tobacco plants without damaging them.

We claim:

1. A plant topping apparatus for traversing rows of standing plants to remove the upper portions of the plants comprising: a mobile support, means for severing the upper portions of plants from the remainder of the plants as the mobile support traverses prescribed plant rows, means for positively controlling and conveying each plant portion severed by said severing means to a prescribed discharge location intermediate alternate plant rows means for mounting said severing means and said controlling and conveying means on said mobile support, angularly disposed members arranged in a V-shaped configuration extending forwardly of said severing means and said controlling and conveying means for directing plants to be cut to said severing means, and a pair of elongated, inclined, spaced wiper blades positioned such that the lower portions are located below said severing means and the upper portions extending upwardly above said controlling and conveying means for depressing the upper leaves of the plants below the severing means before the plant top portions are removed.

2. A plant topping apparatus as defined in claim 1, wherein said means for mounting the severing means and the controlling and conveying means said mobile support includes a frame, and means for adjustably positioning said frame on the mobile support.

3. A plant topping apparatus as defined in claim 1, said severing means including a rotary saw blade.

4. A plant topping apparatus as defined in claim 1, said means for positively controlling and conveying the severed plant portions including opposed conveyor belts having portions spaced proximate to each other for gripping the plant upper portions to be severed.

5. A plant topping apparatus as defined in claim 4, wherein said belt portions spaced proximate to each other travel in the same direction and at the same speed to positively control and convey the severed plant portions.

6. A plant topping apparatus as defined in claim 1, wherein a plurality of said severing means and said controlling and conveying means are supported upon said mounting means.

7. A plant topping apparatus as defined in claim 6, wherein said mounting means includes a frame having vertically and horizontally extending portions, said plurality of severing means and controlling and conveying means being supported in depending relation from said horizontally extending portion.

* * * * *